R. S. SHEPHERD
Nasal-Yokes for Animals.
No. 147,873. Patented Feb. 24, 1874.
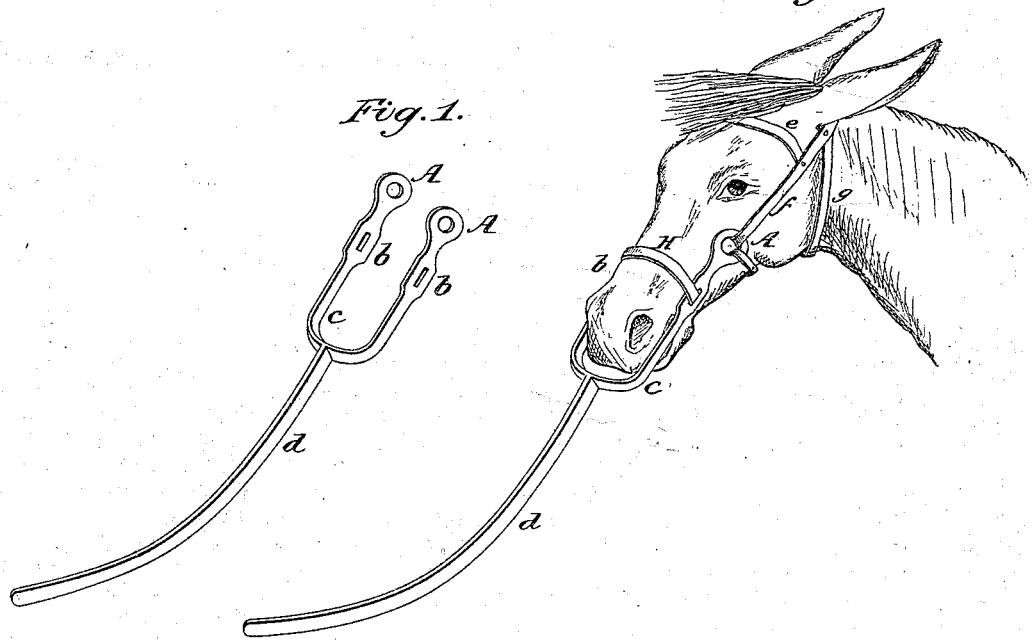
Witnesses.
R. A. Crawford
J. F. McKinley
Inventor.
Richard S. Shepherd

UNITED STATES PATENT OFFICE.

RICHARD S. SHEPHERD, OF MERIWETHER COUNTY, GEORGIA.

IMPROVEMENT IN NASAL YOKES FOR ANIMALS.

Specification forming part of Letters Patent No. 147,873, dated February 24, 1874; application filed July 14, 1873.

*To all whom it may concern:*

Be it known that I, RICHARD S. SHEPHERD, of the county of Merriweather, State of Georgia, have invented a new and Improved Animal-Poke; and I do hereby declare that the following is a full, clear, and exact description of the same, reference being had to the accompanying drawing forming a part of this specification, in which—

Figure 1 is a perspective view of the poke proper; while Fig. 2 shows the same applied to the head of an animal by means of a head-stall.

Pokes of this class have been so constructed and applied to the animal as to impede the free use of his jaws while holding his head in certain positions. My invention consists in so constructing the poke and connecting it with a head and nose strap as to allow free use of the animal's jaws for legitimate purposes without undue or annoying pressure at any point, as will be hereinafter described.

The poke proper is formed of a curved bar, $d$, and prongs or arms $c$, having slots $b$ and holes A, as shown. The head-stall is formed of the brow-band $e$, throat-latch $g$, and the cheek or head strap $f$, whose ends are passed through the holes A of prongs $c$, thus attaching the poke to the animal's head. A strap, H, passes over the nose, and has its ends connected with the prongs at $b$.

By this arrangement the animal can feed on the ground with perfect freedom, or at a small elevation, without being much impeded by the poke; but when he raises his head sufficiently high to reach top rails of ordinary fences, or ears of standing corn, the prongs $c$ assume such a position as to frustrate pushing against the one with his nose or seizing the other with his jaws. The animal can also use his nose freely to brush away flies or other annoying insects from his legs or body.

What I claim as new is—

The combination of the head-strap and nose-strap with the poke, having independent prongs $c$ $c$, provided with slots $b$ and holes A, as shown and described, whereby said poke may be applied to the animal's head, and supported as specified.

RICHARD S. SHEPHERD.

Witnesses:
   ROBERT H. MAGRUDER,
   JOHN J. TUCKER.